United States Patent
Holzleitner et al.

(10) Patent No.: US 10,913,362 B2
(45) Date of Patent: Feb. 9, 2021

(54) LONG STATOR LINEAR MOTOR

(71) Applicant: B&R INDUSTRIAL AUTOMATION GMBH, Eggelsberg (AT)

(72) Inventors: Alois Holzleitner, Braunau am Inn (AT); Martin Höck, Ostermiething (AT); Michael Brucker, Weissenkirchen i.A. (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 168 days.

(21) Appl. No.: 16/130,279

(22) Filed: Sep. 13, 2018

(65) Prior Publication Data
US 2019/0077277 A1    Mar. 14, 2019

(30) Foreign Application Priority Data
Sep. 14, 2017 (EP) ..................................... 17191106

(51) Int. Cl.
*B60L 13/00* (2006.01)
*H02P 6/00* (2016.01)
(Continued)

(52) U.S. Cl.
CPC ........... *B60L 13/003* (2013.01); *B60L 13/006* (2013.01); *B60L 13/03* (2013.01); *B65G 54/02* (2013.01);
(Continued)

(58) Field of Classification Search
CPC ...... B61L 13/003; B61L 13/006; B61L 13/03; H02P 25/062; H02P 25/064; H02P 6/006; B65G 54/02
See application file for complete search history.

(56) References Cited

U.S. PATENT DOCUMENTS 4,800,818 A * 1/1989 Kawaguchi .......... B23Q 7/1436
104/290
4,823,939 A * 4/1989 Langhans .......... B65G 21/2009
198/805
(Continued)

FOREIGN PATENT DOCUMENTS

CN          1772541      5/2006
EP          3 109 998    12/2016
(Continued)

OTHER PUBLICATIONS

European Action conducted in counterpart Europe Appln. No. 17191106.8 (dated Sep. 17, 2019) (w/ partial machine translation).
(Continued)

*Primary Examiner* — Jason C Smith
(74) *Attorney, Agent, or Firm* — Greenblum & Bernstein, P.L.C.

(57) ABSTRACT

For a long stator linear motor comprising a switch and secure guidance of the transport vehicles in the direction of movement along the transport track, it is provided that the transport vehicle (Tn) is force-guided, at least in sections, in the direction of movement (x) outside the switch (W), and at least one one-sided track section (2d) is provided on the transport track (2), along which a vehicle guide element (7) only on one side of the transport track (2) interacts with the track guide element (6) on the assigned side of the transport track (2) for the mechanical forced guidance in the direction of movement (x), and the forced guidance in the direction of movement (x) in the transverse direction (y) is canceled in the region of the switch (W).

6 Claims, 3 Drawing Sheets

(51) Int. Cl.
*H02P 25/064* (2016.01)
*B60L 13/03* (2006.01)
*H02P 25/062* (2016.01)
*B65G 54/02* (2006.01)
*H02K 41/03* (2006.01)
*E01B 25/34* (2006.01)

(52) U.S. Cl.
CPC ............. *H02K 41/03* (2013.01); *H02P 6/006* (2013.01); *H02P 25/062* (2016.02); *H02P 25/064* (2016.02); *B60L 2200/26* (2013.01); *B60Y 2200/34* (2013.01); *B60Y 2400/602* (2013.01); *E01B 25/34* (2013.01); *H02P 2207/05* (2013.01)

(56) References Cited

U.S. PATENT DOCUMENTS

| | | | | |
|---|---|---|---|---|
| 5,027,942 | A * | 7/1991 | Wallaart | B65G 21/2009 198/690.1 |
| 6,191,507 | B1 * | 2/2001 | Peltier | B65G 54/02 310/12.02 |
| 6,326,708 | B1 * | 12/2001 | Tsuboi | B60L 15/005 310/12.06 |
| 9,428,347 | B2 * | 8/2016 | Kleinikkink | B65G 21/2009 |
| 2006/0232141 | A1 * | 10/2006 | Teramachi | H02K 41/031 310/12.21 |
| 2007/0028796 | A1 * | 2/2007 | Lin | B60S 3/004 104/172.3 |
| 2012/0186948 | A1 * | 7/2012 | Ishino | A47F 10/06 198/805 |
| 2015/0048693 | A1 * | 2/2015 | Prussmeier | H02K 11/33 310/12.09 |
| 2015/0083018 | A1 * | 3/2015 | Clark | B60L 13/10 104/282 |
| 2016/0380562 | A1 * | 12/2016 | Weber | H02P 25/062 310/12.11 |
| 2019/0077277 | A1 * | 3/2019 | Holzleitner | B60L 13/03 |
| 2019/0161292 | A1 * | 5/2019 | Brucker | H02K 41/02 |
| 2019/0199189 | A1 * | 6/2019 | Brucker | B60L 13/03 |
| 2019/0372447 | A1 * | 12/2019 | Weber | B60L 15/005 |
| 2020/0028427 | A1 * | 1/2020 | Hoeck | B65G 35/08 |
| 2020/0180872 | A1 * | 6/2020 | Davidson | B60L 13/003 |

FOREIGN PATENT DOCUMENTS

| | | |
|---|---|---|
| FR | 2 197 087 | 3/1974 |
| WO | 2010/140934 | 12/2010 |
| WO | 2012/101004 | 8/2012 |
| WO | 2012/126746 | 9/2012 |
| WO | 2015/042409 | 3/2015 |
| WO | 2018/161160 | 9/2018 |

OTHER PUBLICATIONS

Kong et al., "Magnetic guidance of the Mover in a Long-Primary Linear Motor," IEEE Transactions on Industry Applications, IEEE Service Center, Piscataway, NJ, Bd. 47, Nr. 3 (May 1, 2011).
European Action conducted in counterpart Europe Appln. No. 17191106.8 (dated Mar. 13, 2013).

* cited by examiner

LONG STATOR LINEAR MOTOR

CROSS-REFERENCE TO RELATED APPLICATIONS

The present application claims priority under 35 U.S.C. § 119(a) of Europe Patent Application No. 17191106.8 filed Sep. 14, 2017, the disclosure of which is expressly incorporated by reference herein in its entirety.

BACKGROUND OF THE INVENTION

1. Field of the Invention

The present invention relates to a long stator linear motor, comprising a transport track along which at least one transport vehicle is movably arranged in the direction of movement, wherein on the transport vehicle a respective vehicle guide element is provided on both sides in a transverse direction transversely to the direction of movement, and at least one vehicle guide element cooperates with a track guide element on the transport track so as to guide the transport vehicle along the transport track, and at least one switch is provided on the transport track, which connects a first track section of the transport track to a second track section of the transport track and allows the transport vehicle to switch in the region of the switch in the transverse direction from the first track section to the second track section, or vice versa.

2. Discussion of Background Information

Long stator linear motors are used in a sufficiently known manner for conveying devices for a wide variety of applications. A long stator linear motor is essentially composed of drive coils arranged next to one another, which form the long stator of the long stator linear motor. A number of transport vehicles can be moved along the long stator. The long stator thus also forms a, or a portion of a, transport track along which the transport vehicles can be moved. The drive coils can be energized individually or in groups by applying a coil voltage so as to generate a magnetic field. By regulating the energization of the drive coils, a magnetic field that moves along the transport track can be generated. At least one drive magnet, designed as a permanent magnet or solenoid, is arranged on a transport vehicle and cooperates with the magnetic field generated by the drive coils so as to move the transport vehicle. In this way, it is possible to move multiple transport vehicles independently of one another and with different movement profiles (position, speed, acceleration) along the transport track. The basic design and the basic operating principle of a long stator linear motor are sufficiently known and are therefore not addressed in greater detail here. An example of such a long stator linear motor can be derived from EP 3 109 998 A1, for example.

The transport vehicle of a long stator linear motor must, of course, be suitably guided along the transport track and retained thereon. For this purpose, track guide elements are provided on the transport track, which cooperate with vehicle guide elements on the transport vehicle for guidance along the transport track. Arbitrary guide elements, such as rollers, wheels, sliding elements, guide surfaces and the like, can be used.

U.S. Pat. No. 9,428,347 B2, for example, describes a long stator linear motor comprising a transport vehicle having guide wheels on one side, which roll on assigned guide surfaces on the transport track. The magnetic force of the drive magnets on the transport vehicle is used to retain the transport vehicle on the transport track. Without this magnetic force, the transport vehicle would fall off the transport track. This is intended to make it possible to remove transport vehicles from the transport track, or place these thereon, in a simple manner, without disassembling certain guide elements. This guidance concept consequently does not constitute mechanical forced guidance in the direction of movement, since the vehicle can be moved transversely to the direction of movement. One key disadvantage of this one-sided guidance concept is that the speed of the transport vehicle in curved sections of the transport track is limited due to the acting centrifugal force. The centrifugal force partially, or even entirely, cancels out the acting magnetic retaining force, whereby, in some circumstances (also as a function of the weight of the transport vehicle, including the load), the retention of the transport vehicle on the transport track is no longer ensured, which can cause the transport vehicle to fall off. If the transport vehicle is not loaded symmetrically, it is also possible that the magnetic retaining force is not sufficient to retain the transport vehicle on the transport track. Of course, a transport vehicle is to be prevented from falling off during operation of the long stator linear motor under all circumstances. Apart from that, such a one-sided guidance concept cannot be used to implement a switch in the transport track, or makes this very difficult, since the guidance and the retention of the transport vehicle in the region of the switch is difficult.

WO 2012/101004 A1 describes a long stator linear motor comprising a transport vehicle that is mechanically force-guided in the direction of movement along the transport track, which is to say the transport vehicle can only be moved in this one direction of movement. In this way, the guidance and the retention of the transport vehicle are ensured at all times. Such mechanical forced guidance, however, makes it difficult to implement a switch, and this can only be achieved mechanically, for example by using movable track sections, as is described in WO 2014/047104 A1, which, however, is complex to do.

In WO 2015/042409 A1, the secure guidance of the transport vehicle along the transport track is ensured in that two-sided guidance is provided at all times. For this purpose, vehicle guide elements are provided on both sides (as viewed in the direction of movement) on the transport vehicle, and track guide elements cooperating therewith are likewise provided on both sides of the transport vehicle on the transport track. In this way, the transport vehicle is guided securely at all times in the direction of movement, and falling off the transport track is practically impossible. In this way, it is also possible to implement a switch, since the design of the guidance allows the transport vehicle to move transversely to the direction of movement. Such a design, however, is of course complex, since providing guides on both sides at all times, which makes the long stator linear motor also expensive. Apart from that, double guidance is additionally always more difficult to implement due to manufacturing tolerances, since it must be reliably prevented that the transport vehicle is blocked, or the movement thereof is impeded, by the double guidance.

SUMMARY OF THE EMBODIMENTS

Embodiments of the present invention provide a long stator linear motor in which the complexity for secure guidance of the transport vehicles in the direction of movement along the transport track can be reduced and in which, nonetheless, a switch can be easily implemented.

Accordingly, embodiments are directed to mechanically force-guiding the transport vehicle, at least in sections, in the direction of movement outside the switch and to providing at least one one-side track section on the transport track along which a vehicle guide element on only one side of the transport track interacts with the track guide element on the assigned side of the transport track for the mechanical forced guidance in the direction of movement, and to providing a track guide element, which interacts with a respective vehicle guide element, on both sides in the region of the switch, in which the first track section and the second track section diverge, wherein the mechanical forced guidance in the direction of movement is canceled in the transverse direction in the region of the switch. This embodiment makes it possible for the transport track to have a simpler design since it is not essential for guidance for the transport vehicle to be implemented on both sides. In this way, the transport track can be implemented as a one-sided track section having a simple design, since the forced guidance in the direction of movement is nonetheless ensured. Due to this forced guidance, the transport vehicle is always retained securely on the transport track. So as to still be able to implement a switch in a simple manner, it is provided that in the region of the switch the forced guidance is canceled in the transverse direction, in which the steering motion of the transport vehicle takes place. Since, at a switch, the transport track is always implemented on both sides, it is nonetheless ensured that the transport vehicle cannot fall off the transport track.

It is particularly advantageous if the first track section in the direction of movement of the transport vehicle in front of and/or after the switch is designed as a one-sided track section, since this allows the design complexity for implementing the transport track to be reduced. It is furthermore advantageous for this purpose if the second track section is also designed as a one-sided track section.

So as to cancel the guidance in the transverse direction in a simple manner, it may be provided that the track guide element for guiding the transport vehicle in the transverse direction is removed in the region of the switch. As an alternative, it is also possible for the vehicle guide element for guiding the transport vehicle in the transverse direction to be adjustable in the region of the switch, so as to cancel the interaction between the vehicle guide element for guiding the transport vehicle in the transverse direction and the assigned track guide element.

BRIEF DESCRIPTION OF THE DRAWINGS

The present invention will be described in more detail hereafter with reference to FIGS. 1 to 6, which show advantageous embodiments of the invention by way of example and in a schematic and non-limiting manner. In the drawings.

DETAILED DESCRIPTION OF THE EMBODIMENTS

Figure 1:
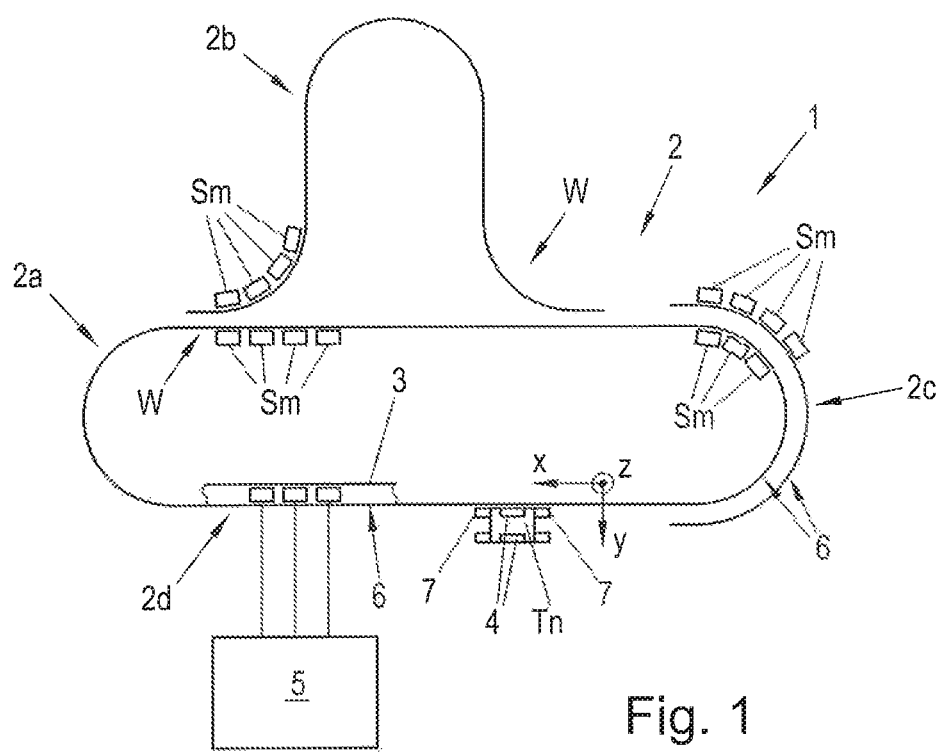
FIG. 1 shows an embodiment of a transport track of a long stator linear motor.

FIG. 1 shows an exemplary conveying application comprising a long stator linear motor 1 including a transport track 2, along which a number of transport vehicles Tn, where $n \geq 1$, can be moved. For the sake of simplicity, FIG. 1 shows only a single transport vehicle Tn, wherein in general a plurality of transport vehicles Tn, and frequently several hundred, is moved simultaneously in such an application. The transport track 2 is formed by drive coils Sm (m denotes an index of 1 to the number of drive coils) arranged next to one another in the direction of movement x, which are arranged on a stationary retaining structure 3 (only hinted at in FIG. 1). The drive coils Sm can be activated by a system control unit 5 (indicated in FIG. 1 for just a few drive coils) so as to energize these and generate a moving magnetic field. Drive magnets 4, which cooperate in the known manner with the magnetic field generated by the drive coils Sm for moving the transport vehicle Tn, are arranged on the transport vehicle Tn on both sides (as viewed in the transverse direction y). Preferably, only the drive coils Sm in the region of the drive magnets 4 of a transport vehicle Tn are energized for moving a transport vehicle Tn.

The Cartesian coordinate system x, y, z that is used is a coordinate system that moves together with the transport vehicle Tn. In this way, x always points in the direction of movement of the transport vehicle Tn, which is essentially predefined by the transport track 2. In a curved track section, the direction of movement is, of course, the tangent to the curvature. The direction of movement x can thus essentially be arbitrarily oriented in space, depending on the design of the transport track 2. The reference letter y denotes the transverse direction transversely to the direction of movement x and in the direction to the air gap 10 between the drive magnet 4 on the transport vehicle Tn and the drive coils Sm on the transport track 2. The axis z is normal to the x and y axes of the transport vehicle Tn. In general, but not necessarily, the plane of the air gap 10 will be parallel to the x-z plane, and the y direction will be normal to the plane of the air gap.

The orientation of the axes of the coordinate system, however, is naturally not limited to the embodiment in the figures, but in principle is arbitrary. For example, it would be possible to implement a long stator linear motor 1 in which the drive coils Sm and the drive magnets 4 are not arranged on the sides, but on the top and/or bottom. In this way, for example, the y and z axes would trade places.

Additionally, at least one switch W is provided on the transport track 2, the switch connecting a first track section 2a and a second track section 2b, branching off therefrom, of the transport track 2 to one another. Operating the switch W establishes whether the transport vehicle Tn is moved further along the first track section 2a or whether the transport vehicle is steered onto the second track section 2b, essentially in the transverse direction y, and continues to be moved along the second track section 2b. In the other direction of movement, two track sections are, of course, combined onto one track section. A switch W can thus generally be traversed in both directions of movement.

Depending on the application and need, the transport track 2 can have any arbitrary shape and can comprise closed and/or open track sections. The transport track 2 also does not have to be located in one plane, for example the x-y plane of FIG. 1, but can be guided arbitrarily in space.

Figure 2:
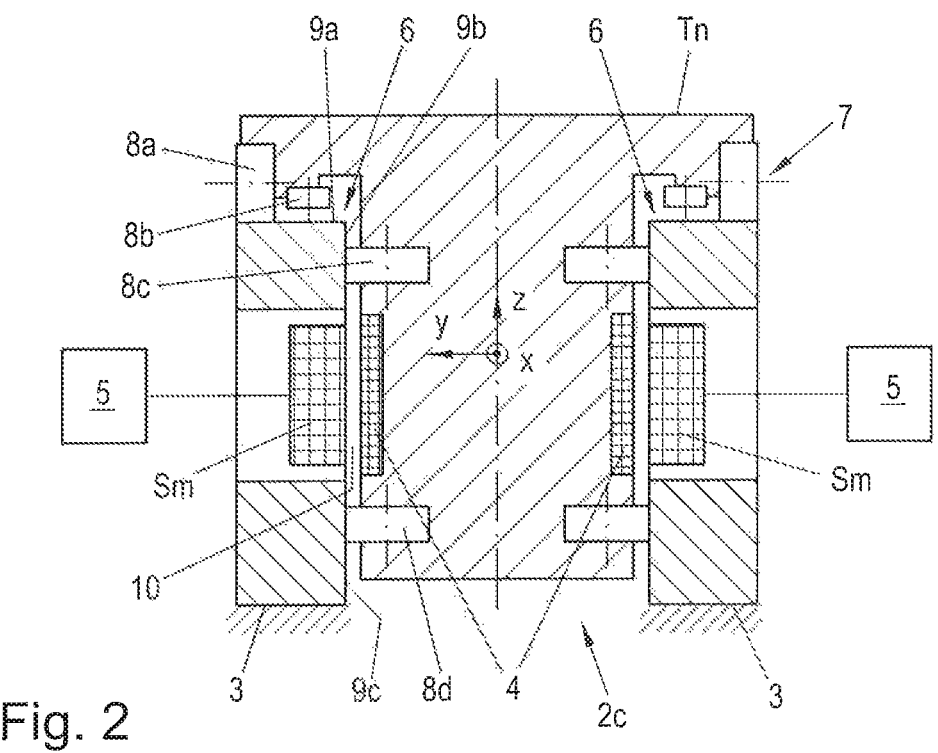
FIG. 2 shows a cross-section through a two-sided track section.

It is decisive for the invention that a vehicle guide element 7 is arranged in the transverse direction y on both sides of the transport vehicle Tn (as viewed in the direction of movement x). Advantageously, the transport vehicle Tn has a symmetrical design about the x-z plane for this purpose, as is illustrated in FIG. 2, for example.

A track guide element 6 is provided on the transport track 2, which cooperates with a vehicle guide element 7 on the transport vehicle Tn so as to guide the transport vehicle Tn along the transport track 2 in the direction of movement x. The track guide element 6 can be arranged on the retaining structure 3, or can be part of the retaining structure 3, but may also be arranged in another manner on the transport track 2. Various elements such as rollers, wheels, sliding elements, guide surfaces, sliding surfaces and the like can be provided for guidance. The drive coils Sm are preferably arranged in the region of the track guide element 6, for example likewise on the retaining structure 3, so as to achieve a compact design.

Figure 3:
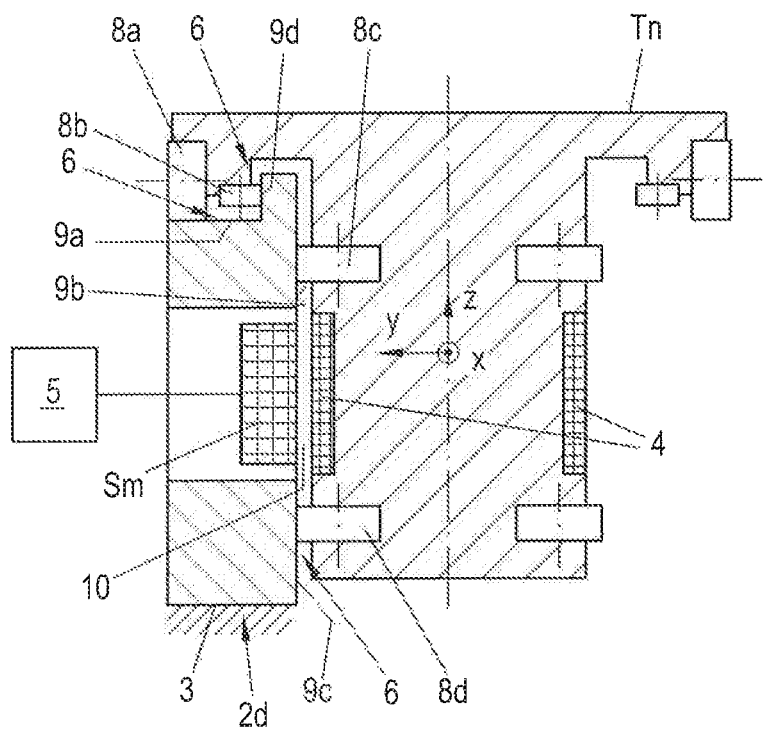
FIG. 3 shows a cross-section through a one-sided track section.

The transport track 2 can have a one-sided or two-sided design (again, as viewed in the transverse direction y), as will be described based on FIG. 2 and FIG. 3. FIGS. 2 and 3 each show a cross-sectional view transversely to the direction of movement x (in the y-z plane) through the transport track 2 and a transport vehicle Tn.

In a two-sided track section 2c (FIG. 2), a track guide element 6 is arranged on both sides, which cooperates with the respective vehicle guide element 7 on the respective side. In a two-sided track section 2c, the transport vehicle Tn is thus mechanically force-guided in the direction of movement x due to the cooperation of the guides on both sides, and in particular, a movement in the transverse direction y is blocked.

In a one-sided track section 2d (FIG. 3), a track guide element 6 is arranged only on one side of the transport track 2 so as to mechanically force-guide the transport vehicle Tn in the direction of movement x, independently of the design of the opposing second side. In such a one-sided track section 2d, the track guide element 6 and the vehicle guide element 7 on the transport vehicle Tn assigned to this side are designed to mechanically force-guide the transport vehicle Tn in the direction of movement x. This means that the transport vehicle Tn is guided securely along the transport track 2 and is retained thereon only by the cooperation between the track guide element 6 and the vehicle guide element 7 on one side.

Figure 6:
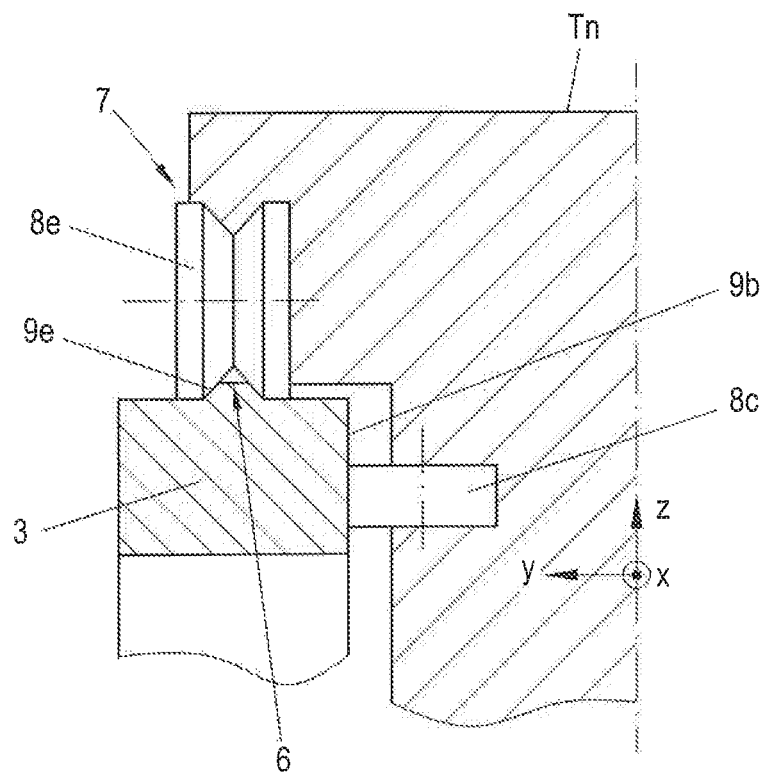
FIG. 6 shows a possible embodiment of a track guide element and a vehicle guide element.

In the shown exemplary embodiment, the track guide element 6 is formed in the one-sided track section 2d (FIG. 3) by four guide surfaces 9a, 9b, 9c, 9d on the retaining structure 3, on which guide rollers 8a, 8b, 8c, 8d roll. As viewed in the direction of movement x, it is possible, of course, for multiple guide rollers 8a, 8b, 8c, 8d to be arranged behind one another. The guide rollers 8a, 8b, 8c, 8d are rotatably mounted on the transport vehicle Tn and form the vehicle guide element 7. Of course, the track guide element 6 and the vehicle guide element 7 can be designed in a wide variety of ways. For example, it is possible that only one guide roller 8e, which blocks the movement in the z and y directions, is provided instead of three guide rollers 8a, 8b, 8c. For this purpose, a V-shaped notch could be provided in the running surface of such a guide roller 8e, which rolls on a V-shaped guide surface 9e, as is shown in FIG. 6. However, a guide roller 8a could also be arranged in such a way that this roller rolls on two guide surfaces 9a, 9b. It is decisive for the invention that the track guide element 6 and the vehicle guide element 7 cooperate on a one-sided track section 2d, so that the transport vehicle Tn is mechanically force-guided in the direction of movement x. In this way, it is ensured that the transport vehicle Tn is securely retained and guided on the transport track 2 at all times, even along a one-sided track section 2d, and for this purpose in particular no magnetic force of the drive magnets 4 is required. In general, however, this also means that the transport vehicle Tn cannot be readily removed from the transport track 2 or placed thereon. It may be necessary for this purpose to remove certain parts of the guidance system.

In a two-sided track section 2c, in which the transport vehicle Tn is of course unchanged, a track guide element 6 on one side can, of course, be implemented identically to a one-sided track section 2d. However, since in a two-sided track section 2c the movability of the transport vehicle Tn is blocked to begin with, in particular in the transverse direction y, the track guide element 6 can also have a simpler design on one side, or on both sides (as is indicated in FIG. 2, for example). Certain guide surfaces, such as the guide surface 9d, can be dispensed with in a two-sided track section 2c, whereby a vehicle guide element 7 assigned to such a guide surface, for example the guide roller 8b, may also be without a function in a two-sided track section 2c.

Mechanically force-guided in the direction of movement x within the meaning of the invention shall be understood to mean that the transport vehicle Tn can only be moved in the direction of movement x by the guidance, which is to say by the cooperation between the vehicle guide element 7 and the track guide element 6, as a result of the operation of the long stator linear motor 1, and the other directions (y, z), and in particular also rotational directions (rotation about x, y, z axis), are blocked. In FIGS. 2 and 3, the acting gravity of the transport vehicle Tn, including the load, prevents the transport vehicle Tn from moving in the z direction (upwardly in FIGS. 2 and 3) during operation. In this way, the transport vehicle Tn cannot move in this z direction as a result of the operation of the long stator linear motor 1 (which is to say by the forces caused by the drive coils Sm). This is also still considered to fall under mechanical forced guidance in the direction of movement x. It is therefore not necessary to block the z axis specifically in both directions. However, it may also be provided, of course, that the cooperation between the track guide element 6 and the vehicle guide element 7 also causes the z axis to be blocked in both directions, for example by an additional guide roller, or by a guide roller 8c having a V-shaped notch and associated V-shaped guide surface 9b.

The invention is based on the assumption that there is at least a one-sided track section 2d along the transport track 2. This means that the vehicle guide element 7 and the track guide element 6 have to be designed in such a way that mechanical forced guidance in the direction of movement x is ensured along this one-sided track section 2d.

In the region of the switch W, however, the mechanical forced guidance, regardless of whether a one-sided track section 2d or a two-sided track section 2b having forced guidance in the direction of movement x is provided in front of the switch W in the direction of movement, would prevent the transport vehicle Tn from switching, for example, from the first track section 2a in the transverse direction y to the second track section 2b, since the movement in the transverse direction y would be blocked by the forced guidance. It is therefore provided according to the invention that the mechanical forced guidance of the transport vehicle Tn, created by the track guide element 6 and the vehicle guide element 7, is canceled in the transverse direction y in the region of the switch, so as to allow a movement of the transport vehicle Tn in the transverse direction y in the region of the switch. In this way, the transport vehicle Tn can now be steered in the transverse direction y either onto the first track section 2a or the second track section 2b.

As a result, however, the transport vehicle Tn would no longer be securely guided in the direction of movement x. The switch W, however, means that the transport track 2 must have a two-sided design in the region of the switch W. In this way, a track guide element 6 is always provided on both sides in the region of the switch W, in which the two track sections 2a, 2b diverge. Since the vehicle guide element 7 has likewise been provided on both sides of the transport vehicle Tn, the transport vehicle Tn is nonetheless securely guided in the region of the switch W and retained on the transport track 2. This precludes the transport vehicle Tn from falling off in the region of the switch W. At the latest after the point at which the two track sections 2a, 2b have diverged so far that the vehicle guide element 7 on one side is no longer able to cooperate with the assigned track guide element 6, the mechanical forced guidance of the transport vehicle Tn in the direction of movement must be ensured again, so as to reliably prevent the transport vehicle Tn from falling off the transport track 2.

Figure 4:
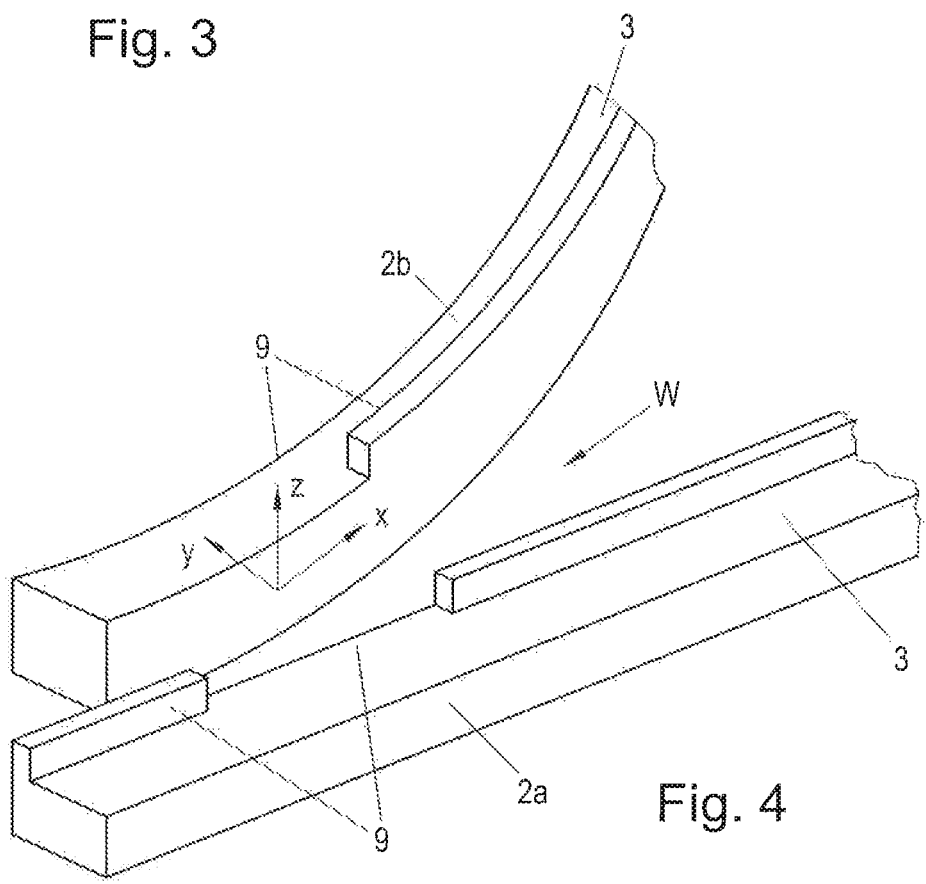
FIG. 4 shows an embodiment of the track guide element in the region of a switch.
Figure 5:
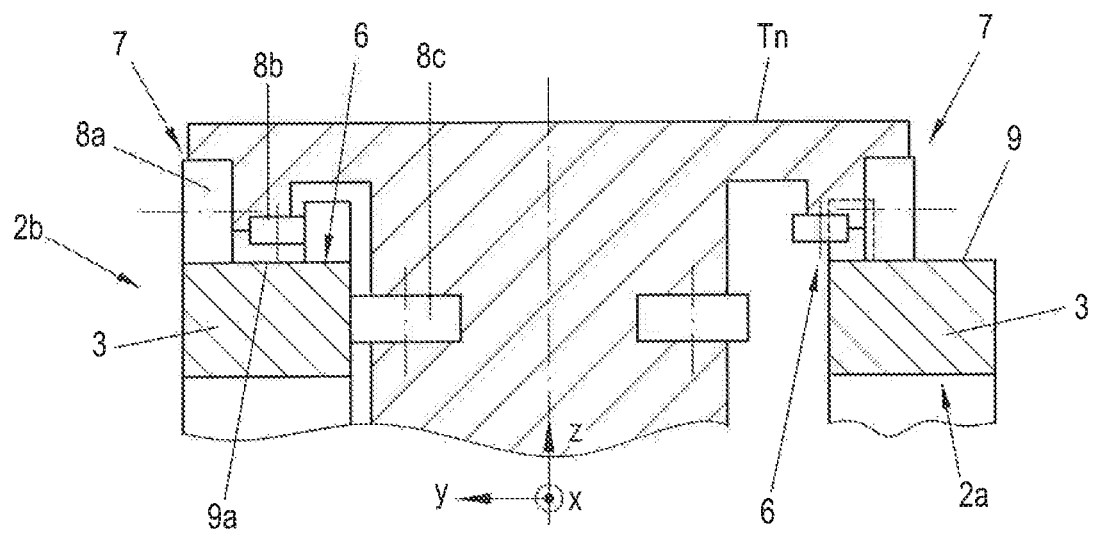
FIG. 5 shows a cross-section in the region of a switch.

Canceling the mechanical restricted guidance in the transverse direction y can, of course, likewise take place in a variety of ways. For example, the portion of the track guide element 6 responsible for blocking the movement of the transport vehicle Tn in the transverse direction y can be eliminated. In one possible embodiment, a guide surface 9 of the track guide element 6, for example the guide surface 9d, which blocks the movement in the transverse direction y, can be eliminated in the region of the switch W, as is illustrated in FIG. 3 and FIG. 4. In FIGS. 3 and 4, for example, the projection on the retaining structure 3, which forms a guide surface 9d for a guide roller 8b for blocking the transverse direction y, is recessed in the region of the switch W. The transport vehicle Tn is thus also able to move in the transverse direction y in the region of the switch W, as is indicated in FIG. 5. In the region of the switch W, the transport vehicle Tn is thus able to switch in the transverse direction y from a track section 2a, on which the transport vehicle Tn enters the switch W, onto a track section 2b that branches off, on which the transport vehicle Tn leaves the switch W.

However, it is also possible for the vehicle guide element 7 on the transport vehicle Tn, which is responsible for the guidance in the transverse direction y, to be adjusted in the region of the switch W so that the guidance in the transverse direction y is canceled. For example, a guide roller 8b could be disengaged or pivoted away, so as to no longer be able to roll on the associated guide surface 9d of the track guide element 6. The adjustment of the vehicle guide element 7 can take place actively by a drive on the transport vehicle Tn, or also passively by the movement of the transport vehicle Tn, for example by way of an appropriate ramp control.

It is also possible, of course, to change both, which is to say the track guide element 6 and the vehicle guide element 7, so as to cancel the guidance in the transverse direction in the region of the switch W.

The mechanical forced guidance in the direction of movement x is restored after the region of the switch W, for example in that the recess of the projection is undone or the guide roller 8b is pivoted in or engaged again, and, after the switch W, the transport vehicle Tn again moves on the desired track section 2a, 2b on one side or two sides, depending on whether the track section after the switch W is a one-sided track section 2d or a two-sided track section 2c, in a mechanically force-guided manner in the direction of movement x.

Just how the further track section 2a, 2b to be traveled on in the switch W is established can be an arbitrary process. For example, the switch could be operated as is described in EP 3 109 998 A1. However, the switch could also be operated mechanically.

Outside the region of a switch W, one-sided mechanical forced guidance is advantageous since the design complexity is lower than with a two-sided track section 2c. However, there may also be track regions in which a higher propulsive force is necessary or desirable, for example an inclination or a region with a high load on the transport vehicle Tn. A two-sided track section 2c can be provided in such a region for this purpose, wherein drive coils Sm can also be provided on both sides so as to increase the achievable propulsive force on the transport vehicle Tn.

The invention claimed is:

1. A long stator linear motor, comprising:
a transport track along which at least one transport vehicle is movably arranged in a direction of movement, the transport track comprising a track guide element;
a vehicle guide element located on opposite sides of the at least one transport vehicle so as to be separated in a direction transverse to the direction of movement;
at least one vehicle guide element interacting with the track guide element to guide the transport vehicle along the transport track; and
the transport track further comprising at least one switch, which connects a first track section of the transport track to a second track section of the transport track, the switch being structured to allow the transport vehicle, in a region of the switch, to switch, in the direction traverse to the direction of movement, from the first track section to the second track section, or from the second track section to the first track section,
wherein, outside of the switch, the at least one transport vehicle is moved via mechanical forced guidance, at least in sections, in the direction of movement,
wherein the transport track further comprises at least one one-side track section, along which the vehicle guide element only on one side of the at least one transport vehicle interacts with the track guide element on an assigned side of the transport track for the mechanical forced guidance in the direction of movement,
wherein, the first track section and the second track section diverge at the least one switch and, in the region of the at least one switch, track guide elements interact with the vehicle guide elements on the opposite sides of the at least one vehicle, and the mechanical forced guidance in the direction of movement is canceled in the transverse direction.

2. The long stator linear motor according to claim 1, wherein the first track section in the direction of movement of the transport vehicle in front of and/or after the switch is designed as a one-sided track section.

3. The long stator linear motor according to claim 2, wherein the second track section is designed as a second one-sided track section.

4. The long stator linear motor according to claim 1, wherein the track guide element for guiding the transport vehicle in the transverse direction is removed in the region of the switch.

5. The long stator linear motor according to claim 1, wherein the vehicle guide element for guiding the transport vehicle in the transverse direction is adjustable in the region of the switch, so as to cancel the interaction between the vehicle guide element and the assigned track guide element for guiding the transport vehicle in the transverse direction.

6. The long stator linear motor according to claim 1, wherein the second track section is designed as a one-sided track section.

* * * * *